United States Patent [19]
Scheller

[11] Patent Number: 5,711,617
[45] Date of Patent: Jan. 27, 1998

[54] DUSTCAP FOR BEARING ASSEMBLY

[75] Inventor: Horst H. Scheller, Valparaiso, Ind.

[73] Assignee: MB Manufacturing, Inc., Valparaiso, Ind.

[21] Appl. No.: 699,773

[22] Filed: Aug. 15, 1996

[51] Int. Cl.$^6$ ................................................. F16C 33/76
[52] U.S. Cl. ...................... 384/484; 384/489; 384/903
[58] Field of Search ............................. 384/489, 484, 384/903, 486, 481

[56] References Cited

U.S. PATENT DOCUMENTS

| | | | |
|---|---|---|---|
| 2,639,954 | 5/1953 | Potter | 384/484 |
| 5,005,992 | 4/1991 | Dreschmann et al. | 384/484 |
| 5,195,807 | 3/1993 | Lederman | 301/108.1 |
| 5,380,103 | 1/1995 | Lederman | 384/489 |

OTHER PUBLICATIONS

"Composite Mounted Bearing Units for the Food Processing Industry", MRC Bearing Services Catalog, Motion Industries, Inc., 11 pages (Sep. 1993).

"Corrosion–resistant mounted ball bearing", The Torrington Co. advertisement, *Power Transmission Design*, 1 page (Jun. 1995).

Dodge Engineering Catalog vol. 1.1, IBT, Inc., cover, inside cover and p. B2–102 (1993).

"LifeGard Flange Bearings", Valu Engineering, Inc. advertisement, 2 pages (1994).

"Link–Belt Bearings", Rexnord Corporation advertisement/brochure, 6 pages (Mar. 1996).

New Departure Hyatt advertisement/brochure, 3 pages (Mar. 1985).

*Primary Examiner*—Lenard A. Footland
*Attorney, Agent, or Firm*—Renner, Kenner, Greive, Bobak, Taylor & Weber

[57] ABSTRACT

A dustcap (10) for a bearing assembly (12) includes a sidewall (50) having a first end (52) and a second end (54). An endwall (56) extends from the second end (54) of the sidewall (50) to form a cup. A lip (60) extends radially outward from the first end (52) of the sidewall (50). The lip (60) has a first angled portion (62) and a second angled portion (64) connected to form a circumferential apex (66). The bearing assembly (12) has an outer race ring (20) that cooperates with an inner race ring (22) to form a raceway (26) in which a plurality of balls (24) are disposed. The outer race ring (20) has a seal groove (40A) disposed therein which is configured to accept the apex (64) of the lip (60) of the dustcap (10) in a snap fit. By connecting the dustcap (10) to the outer race ring (20) of the bearing assembly (12), the dustcap (10) remains aligned with the bearing assembly (12) when the bearing assembly (12) becomes misaligned. By remaining aligned with the bearing assembly (12), the dustcap (10) is not ejected from the bearing assembly (12).

9 Claims, 4 Drawing Sheets

DUSTCAP FOR BEARING ASSEMBLY

TECHNICAL FIELD

The present invention relates generally to a dustcap for a bearing assembly. More particularly, the present invention relates to a dustcap for a bearing assembly that connects directly to the bearing assembly such that the dustcap remains aligned with the bearing assembly. Specifically, the present invention relates to a dustcap that snap fits into a seal groove in an outer race ring of a bearing assembly such that the dustcap does not become displaced when the bearing assembly becomes misaligned in a housing due to shaft misalignment.

BACKGROUND OF THE INVENTION

Bearing assemblies are used in a wide variety of applications that exist in environments prone to the exposure to dust and other contaminants. When dust or other contaminants collect in a bearing assembly, the friction-reducing properties of the bearing assembly are negatively affected. It is thus desirable to provide a dustcap for a bearing assembly that prevents dust and contaminants from entering the bearing assembly while not interfering with the operation of the bearing assembly.

Such dustcaps must be connected to the bearing assembly in a manner that allows the bearing assembly to function without interference from the dustcap while at the same time protecting the working parts from the outside environment. It is desirable to provide a dustcap that can be connected to a bearing assembly without requiring modifications to the existing bearing assemblies in order to avoid the increased cost of manufacturing entirely new bearing-dustcap assemblies.

In a typical application, a bearing assembly is gimbaled in a housing. The housing is typically carried by a support structure while the bearing assembly typically supports a rotating shaft. One dustcap configuration for a bearing assembly that can be utilized without requiring modification of the bearing assembly is a dustcap that press fits into the housing which is supporting the bearing assembly. There are, however, disadvantages with this design. One disadvantage is that the housing must be configured to accept the dustcap. In particular, the housing bore must be substantially circular and the face of the housing where the dustcap connects must be substantially planar. Furthermore, a dustcap that is press fit into a housing bore is often ejected from the housing bore when the bearing assembly becomes misaligned when the shaft supported by the bearing assembly becomes misaligned. When the bearing assembly becomes misaligned, the outer race ring of the assembly contacts the portion of the dustcap that is inside the housing bore and overcomes the force of the press fit thereby ejecting the dustcap from the housing bore and undesirably detaching the dustcap from the bearing assembly. Thus, the need exists for a dustcap which will not become dislodged from its bearing assembly upon misalignment of the bearing assembly in the housing.

DISCLOSURE OF THE INVENTION

It is, therefore, a primary object of the present invention to provide a dust cap for a bearing assembly that connects to the bearing assembly in such a way that it remains aligned with the bearing assembly even if the bearing assembly becomes misaligned in the housing.

It is another object of the present invention to provide a dustcap, as above, that may be manufactured to be accepted by existing bearing assemblies without modification of the bearing assemblies or housing faces.

It is a further object of the present invention to provide a dustcap, as above, that may be quickly and easily installed and removed from a bearing assembly.

It is still another object of the present invention to provide a dustcap, as above, that connects with a bearing assembly approximately 360 degrees around the bearing assembly.

It is yet another object of the present invention to provide a dustcap, as above, that is not dependent on the configuration of the housing of the bearing assembly to connect with the bearing assembly in the housing.

It is an additional object of the present invention to provide a dustcap, as above, that snap-fits into the seal groove of the outer race ring of the bearing assembly such that the dustcap pivots with the bearing assembly when the bearing assembly becomes misaligned in the housing.

It is still a further object of the present invention to provide a dustcap, as above, that snap-fits into the seal groove while permitting the seal of the bearing assembly to continue to operate.

These and other objects of the invention, as well as the advantages thereof over existing and prior art forms, which will be apparent in view of the following detailed specification, are accomplished by improvements hereinafter described and claimed.

In general, the present invention includes a bearing assembly and a dustcap. The bearing assembly has a race ring with a groove therein and the dustcap has a lip extending outwardly therefrom. The lip of the dustcap is receivable in the groove of the race ring.

To acquaint persons skilled in the arts most closely related to the present invention, one preferred embodiment of a dustcap that illustrates a best mode now contemplated for putting the invention into practice is described herein by, and with reference to, the annexed drawings that form a part of the specification. The exemplary dustcap is described in detail without attempting to show all of the various forms and modification in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

PREFERRED EMBODIMENT FOR CARRYING OUT THE INVENTION

Figure 1:
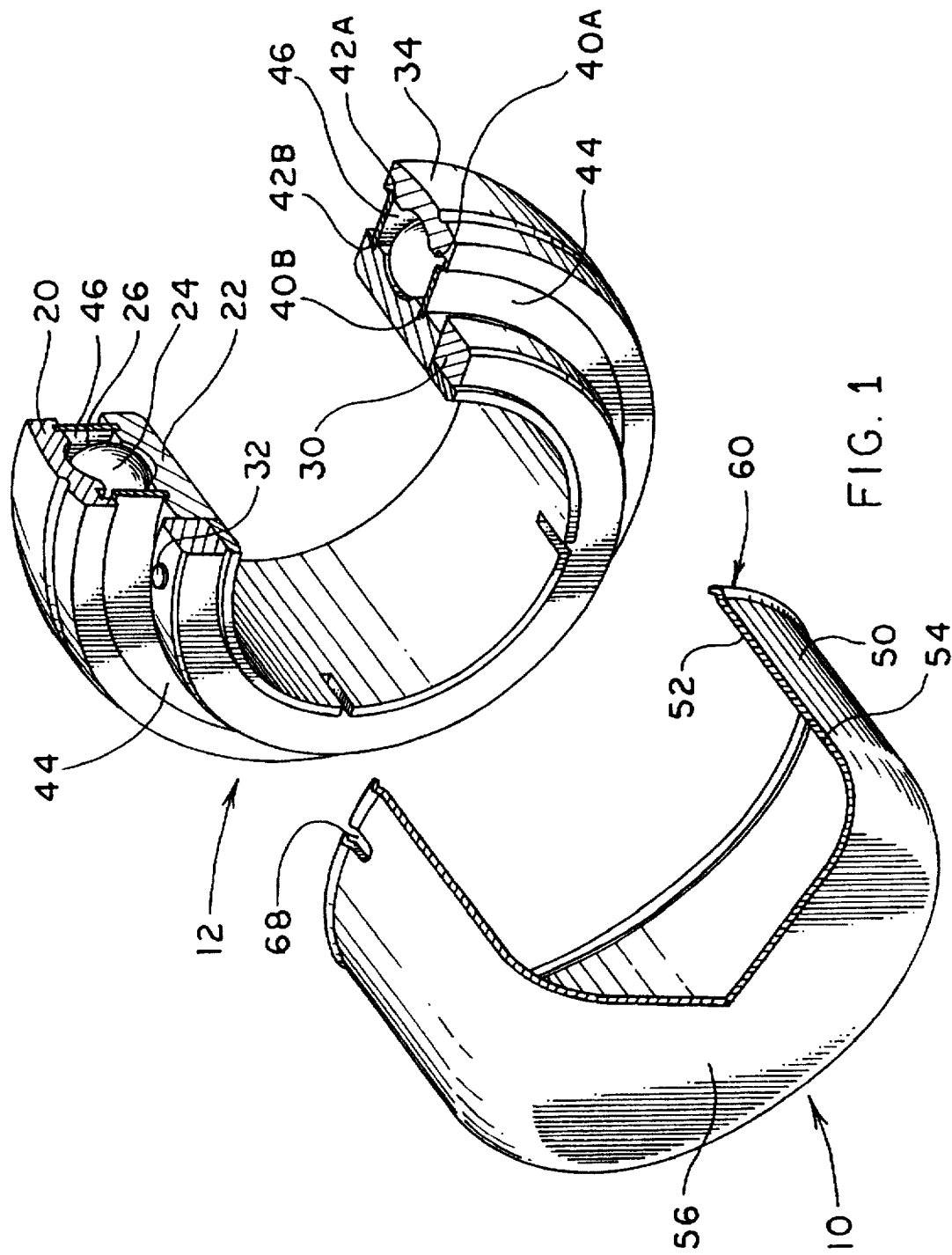
FIG. 1 is an exploded perspective view of a bearing assembly having a dustcap made in accordance with the concepts of the present invention, one portion of the bearing assembly and dustcap being shown in section.
Figure 2:
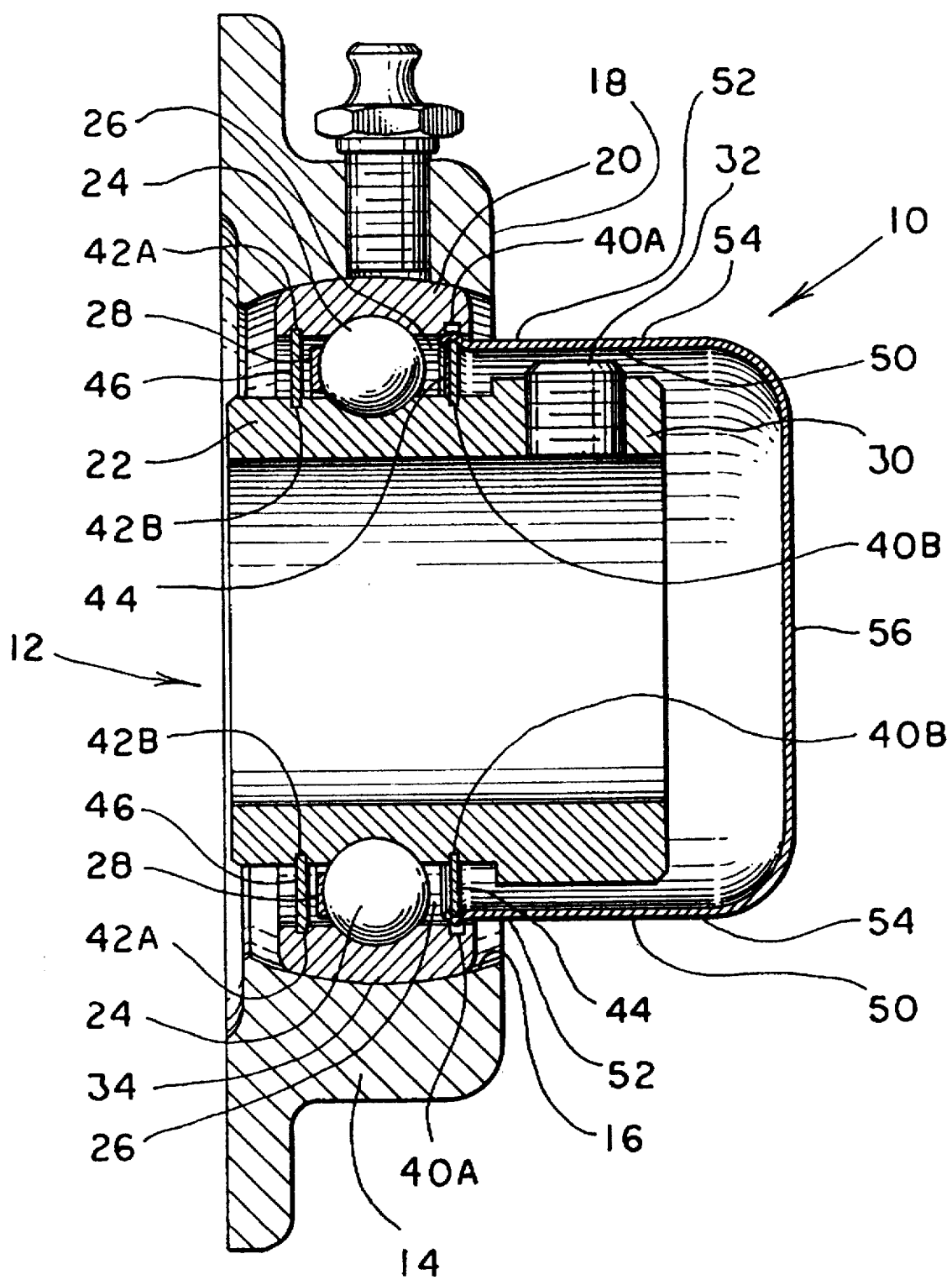
FIG. 2 is sectional side view of an aligned bearing assembly and dustcap.
Figure 3:
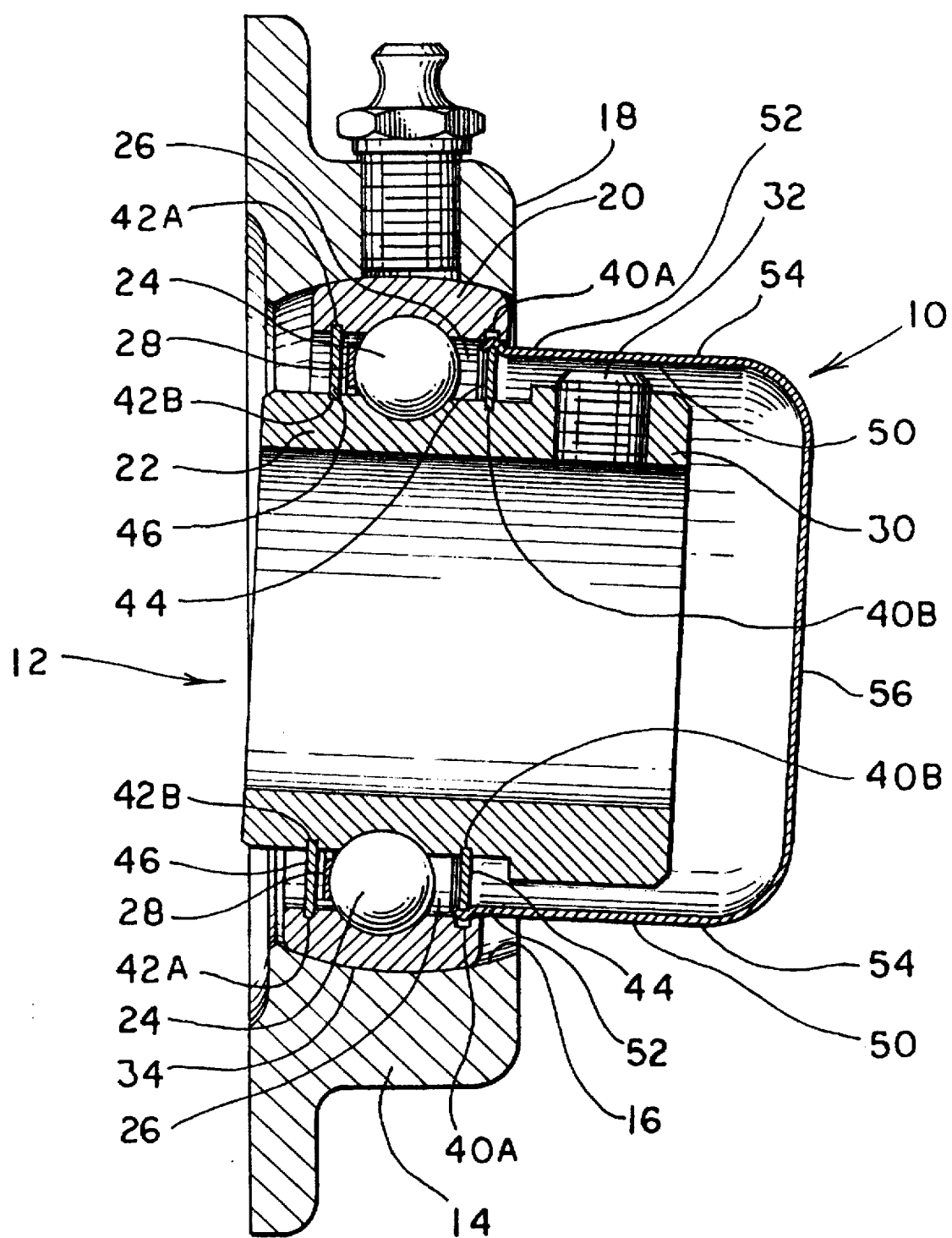
FIG. 3 is sectional side view of a misaligned bearing assembly and dustcap.
Figure 4:
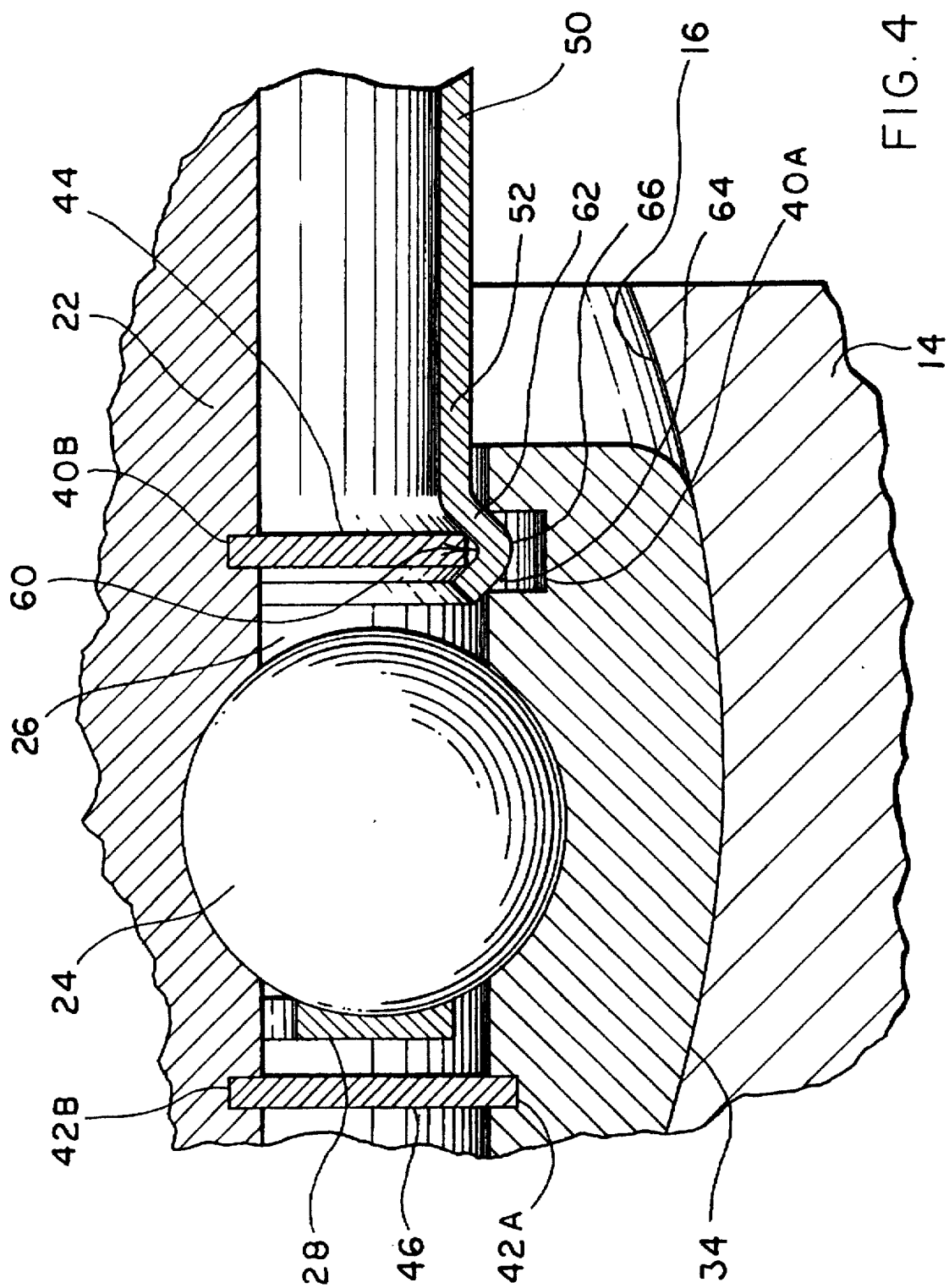
FIG. 4 is a fragmented, enlarged sectional view of the connection between the dustcap and the seal groove.

One representative form of a dustcap embodying the concepts of the present invention is indicated generally by the numeral 10 on the accompanying drawings. Dustcap 10 is adapted to be used with a bearing assembly generally indicated by the numeral 12, and, as shown in FIGS. 2 and 3, is carried by a housing 14 having a housing bore 16 and a face 18.

Bearing assembly 12 includes an outer race ring 20 and an inner race ring 22 which are spaced apart for receiving anti-friction elements therebetween such as balls 24. Balls 24 are retained in a bearing raceway 26 that is defined by the outer and inner race rings 20 and 22, respectively. A retainer 28 spaces balls 24 in raceway 26. Inner race ring 22 has an extension 30 having a set screw 32 threadedly disposed therethrough. Set screw 32 functions to connect a shaft (not shown) to inner race ring 22 such that inner race ring 22 rotates with the shaft. Outer race ring 20 has a curved outer surface 34 that substantially matches the curved surface of housing bore 16. The configuration of outer surface 34 allows bearing assembly 12 to gimbal in housing bore 16 when bearing assembly 12 becomes misaligned due to shaft misalignment.

Each race ring 20 and 22 has first and second seal grooves 40A, 40B and 42A, 42B, respectively, disposed therein. Each seal groove 40A, 40B and 42A, 42B extends 360 degrees about its respective race ring 20 and 22. First seal grooves 40 are opposingly disposed on one side of raceway 26. Similarly, second seal grooves 42 are opposingly disposed on the other side of raceway 26. First and second flexible seals 44 and 46, respectively, are positioned in opposing seal grooves 40 and 42, respectively, such that balls 24 are enclosed by outer race ring 20, inner race ring 22, and first and second seals 44 and 46.

Dustcap 10 generally includes a cylindrical sidewall 50 having a first open end 52 and a second end 54. A generally circular endwall 56 integrally connects with second end 54 of sidewall 50 to form a cup. In other embodiments of the present invention, the configuration of dustcap 10 may vary from the cup-shaped dustcap 10 depicted in the drawings. Regardless of the configuration of dustcap 10, a circumferential lip 60 integrally extends radially outward from open end 52 of sidewall 50. Lip 60 includes a first angled portion 62 and a second angled portion 64 that at their junction form a circumferential apex 66 around dustcap 10.

Dustcap 10 has a slot 68 formed in first end 52 of sidewall 50 so that a lever may be inserted into in slot 68 to remove dustcap 10 from bearing assembly 12 after it has been installed. During operation, slot 68 may be covered by an appropriate material in order to completely seal bearing assembly 12 from the outside environment.

To attach dustcap 10 to bearing assembly 12, dustcap 10 is forced against outer race ring 20 until apex 66 snap-fits into seal groove 40A as is depicted in FIGS. 2 and 3. The connection is approximately 360 degrees around seal groove 40A with the only portion not in contact with groove 40A being the width of slot 68. This full 360 degree connection forms a tight seal and a strong connection between bearing assembly 12 and dustcap 10. Flexible seal 44 is pushed out of the way when dustcap 10 is inserted, but snaps back under dustcap 10 as is shown in the figures or simply bends toward ball bearings 24. In either case, the insertion of dustcap 10 into seal groove 40A does not interfere with the operation of bearing assembly 12.

Once dustcap 10 is properly installed, dustcap 10 acts as an integral part of bearing assembly 12 during operation. Should bearing assembly 12 become misaligned because the shaft (not shown) attached to inner race ring 22 becomes misaligned, bearing assembly 12 tilts with the shaft and pivots with respect to housing bore 16. Housing bore 16 and outer surface 34 of outer race ring 20 are typically well lubricated to facilitate such motion. Although bearing assembly 12 may become misaligned with respect to housing 14, dustcap 10 tilts with and otherwise remains aligned with bearing assembly 12 at all times and is thus not ejected from bearing assembly 12.

While only a preferred embodiment of the present invention is disclosed, it is to be clearly understood that the invention is susceptible to numerous changes apparent to one skilled in the art. Therefore, the scope of the present invention is not to be limited to the details shown and described but is intended to include all changes and modifications which come within the scope of the appended claims.

I claim:

1. In combination, a bearing assembly and a dustcap, the bearing assembly having an outer race ring and an inner race ring with a plurality of ball bearings therebetween, the bearing assembly being gimballed in a housing such that said outer race ring may slide against said housing, said outer race ring having a groove therein and the dustcap having a lip extending outwardly therefrom, said lip being receivable in said groove to support said dustcap from said outer race ring such that said dustcap gimbals with said outer race ring and is not ejected by said gimballing outer race ring, and a seal normally disposed in said groove, said seal being displaced by said lip when said lip is received in said groove.

2. The combination according to claim 1, wherein said dustcap includes a substantially cylindrical sidewall having first and second ends; said lip extending radially outward from said first end; and an endwall enclosing said second end.

3. The combination according to claim 2, wherein said lip extends approximately 360 degrees around said dustcap.

4. The combination according to claim 2, wherein said lip includes a first angled portion connected to a second angled portion to form a circumferential apex.

5. Apparatus associated with a rotating shaft subject to misalignment, comprising a housing having a curved housing bore, an outer race ring slidingly disposed in said housing bore, an inner race ring carried by the shaft, a plurality of ball bearings disposed between said outer race ring and said inner race ring, the inner surface of said outer race ring having a groove, a dustcap having a sidewall with a lip extending radially outwardly therefrom, said dustcap being connected to said outer race ring when said lip is received in said groove in said outer race ring, and a seal extending between said inner race ring and said lip of said dustcap.

6. Apparatus according to claim 5, wherein said sidewall has a slot therein.

7. Apparatus according to claim 5, wherein said lip extends approximately 360 degrees around said sidewall.

8. Apparatus according to claim 5, wherein said lip includes a first angled portion connected to a second angled portion to define an apex.

9. Apparatus according to claim 8, wherein said apex is received in the groove in the race ring.

* * * * *